US011239782B2

(12) United States Patent
Barth et al.

(10) Patent No.: US 11,239,782 B2
(45) Date of Patent: Feb. 1, 2022

(54) CONTROL SYSTEM FOR A SENSOR-FREE ELECTRIC MOTOR

(71) Applicant: Infineon Technologies AG, Neubiberg (DE)

(72) Inventors: Martin Barth, Munich (DE); Qifan Yang, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/838,861

(22) Filed: Apr. 2, 2020

(65) Prior Publication Data

US 2020/0321897 A1   Oct. 8, 2020

(30) Foreign Application Priority Data

Apr. 3, 2019   (DE) .................... 102019108725.2

(51) Int. Cl.
| | |
|---|---|
| H02P 21/14 | (2016.01) |
| H02P 21/22 | (2016.01) |
| H02P 21/00 | (2016.01) |
| H02P 21/18 | (2016.01) |
| H02P 27/06 | (2006.01) |

(52) U.S. Cl.
CPC .......... *H02P 21/22* (2016.02); *H02P 21/0003* (2013.01); *H02P 21/141* (2013.01); *H02P 21/18* (2016.02); *H02P 27/06* (2013.01)

(58) Field of Classification Search
CPC .... H02P 21/22; H02P 21/141; H02P 21/0003; H02P 21/18; H02P 27/06; H02P 29/024; G05B 2219/37622; G05B 2219/42325; G05B 2219/37585; G05B 2219/41391
See application file for complete search history.

(56) References Cited

U.S. PATENT DOCUMENTS

| | | | | | |
|---|---|---|---|---|---|
| 5,140,244 | A | * | 8/1992 | Lyons ...................... | H02P 6/18 |
| | | | | | 318/761 |
| 5,367,236 | A | * | 11/1994 | Salazar .............. | G05B 19/4062 |
| | | | | | 318/434 |
| 6,856,114 | B2 | * | 2/2005 | Netz ........................ | H02P 6/18 |
| | | | | | 318/700 |

(Continued)

FOREIGN PATENT DOCUMENTS

DE   102006008497 A1   8/2006

OTHER PUBLICATIONS

Office Action, in the German language, from counterpart German Application No. 102019108725.2, dated Nov. 21, 2019, 4 pp.

*Primary Examiner* — Bickey Dhakal
(74) *Attorney, Agent, or Firm* — Shumaker & Sieffert, P.A.

(57) ABSTRACT

A method with which stalling of a rotor of a sensor-free motor can be detected is described below. According to one exemplary embodiment, the method comprises operating an electric motor, wherein a rotation speed of the electric motor is controlled by field-oriented control, and wherein an estimate is calculated, wherein the estimate represents magnetic flux in the electric motor. The method further comprises calculating a value which represents the change in the magnitude of the estimate for the magnetic flux and comparing the calculated value with a threshold value in order to detect whether the calculated value lies below the threshold value. An error is flagged if it is detected that the calculated value lies below the threshold value for a specific time.

10 Claims, 5 Drawing Sheets

(56) References Cited

U.S. PATENT DOCUMENTS

| | | | |
|---|---|---|---|
| 8,432,112 B2* | 4/2013 | Henderson | H02P 6/18 |
| | | | 318/400.21 |
| 10,003,287 B2* | 6/2018 | West | H02P 29/60 |
| 2006/0193090 A1 | 8/2006 | Ho | |
| 2011/0068724 A1 | 3/2011 | Henderson et al. | |
| 2012/0206945 A1* | 8/2012 | Brogan | H02M 1/12 |
| | | | 363/40 |
| 2012/0206954 A1* | 8/2012 | Yoshikawa | G11C 5/063 |
| | | | 365/63 |
| 2017/0126153 A1* | 5/2017 | Lepka | H02P 6/18 |
| 2017/0131340 A1* | 5/2017 | Tallam | H02M 5/458 |
| 2018/0167015 A1 | 6/2018 | Wu | |
| 2019/0229663 A1* | 7/2019 | Ogawa | H02P 21/24 |

* cited by examiner

CONTROL SYSTEM FOR A SENSOR-FREE ELECTRIC MOTOR

This Application claims priority to German Application 102019108725.2 filed Apr. 3, 2019, the entire content of which is incorporated herein by reference.

TECHNICAL FIELD

The present description relates to the field of controlling electric motors, in particular synchronous motors, such as brushless DC motors (BLDC motors) or permanent-magnet synchronous motors (PMSM) for example.

BACKGROUND

A technique which is generally known by the term field-oriented control (FOC) is usually used for controlling sensor-free electric motors, such as BLDC motors or PMSMs for example. Field-oriented control is also referred to as vector control. Concepts for sensor-free FOC are also known, wherein, in this context, "sensor-free" means that the motor does not have to be equipped with a rotary encoder for control of the motor. In this case, the rotation speed of the motor cannot be directly measured, but rather estimates for the angular position and the rotation speed of the rotor are ascertained on the basis of the voltages with which the motor windings are driven and the motor current. The angular position is ascertained by way of a complex value (amplitude and angle) for the magnetic flux in the rotor (rotor flux) being calculated with the aid of a mathematical model of the motor.

The estimation of the rotor flux and of the rotation speed of the rotor no longer functions correctly if the rotor comes to a standstill (for whatever reason). A stalled rotor cannot be reliably detected using the known FOC concepts, and this can result in the control arrangement continuing to drive the motor. This can lead to overheating and to damage of the motor.

SUMMARY

A method with which stalling of a rotor of a sensor-free motor can be detected is described below. According to one exemplary embodiment, the method comprises operating an electric motor, wherein a rotation speed of the electric motor is controlled by means of field-oriented control, and wherein an estimate is calculated, which estimate represents the magnetic flux in the electric motor. The method further comprises calculating a value which represents the change in the magnitude of the estimate for the magnetic flux and comparing the calculated value with a threshold value in order to detect whether the calculated value lies below the threshold value. An error is flagged if it is detected that the calculated value lies below the threshold value for a specific time.

A system is also described, which system, according to one exemplary embodiment, comprises an electric motor and a motor control arrangement which is coupled to the electric motor and is designed to drive the electric motor and to control the rotation speed of said electric motor by means of field-oriented control. The motor control arrangement is further designed to calculate an estimate which represents the magnetic flux in the electric motor, to calculate a value which represents the change in the magnitude of the estimate for the magnetic flux, to compare the calculated value with a threshold value in order to detect whether the calculated value lies below the threshold value. An error is flagged if it is detected that the calculated value lies below the threshold value for a specific time.

An integrated circuit is furthermore described, which integrated circuit, according to one exemplary embodiment, has a circuit arrangement which is designed to carry out field-oriented control for a synchronous motor. The circuit arrangement comprises a flux estimator which is designed to calculate an estimate for a magnetic flux in the synchronous motor. The integrated circuit further has a detector circuit which is designed to detect stalling of the rotor of the synchronous motor based on the estimate by way of: a value being calculated, which value represents the change in the magnitude of the estimate for the magnetic flux, the calculated value being compared with a threshold value in order to detect whether the calculated value lies below the threshold value, and the rotor being detected as stalled if the calculated value lies below the threshold value for a specific time.

BRIEF DESCRIPTION OF THE DRAWINGS

Exemplary embodiments will be explained in more detail below with reference to figures. The illustrations are not necessarily true to scale and the exemplary embodiments are not limited to the illustrated aspects. Rather, importance is placed on illustrating the principles on which the exemplary embodiments are based. In the figures:

FIGS. 5A and 5B are timing diagrams, corresponding to FIGS. 2A, 2B, and 2C, for illustrating the time profile of the estimated rotor flux (cf. FIGS. 2A, 2B, and 2C) and the corresponding percentage change in the rotor flux.

DETAILED DESCRIPTION

Figure 1:
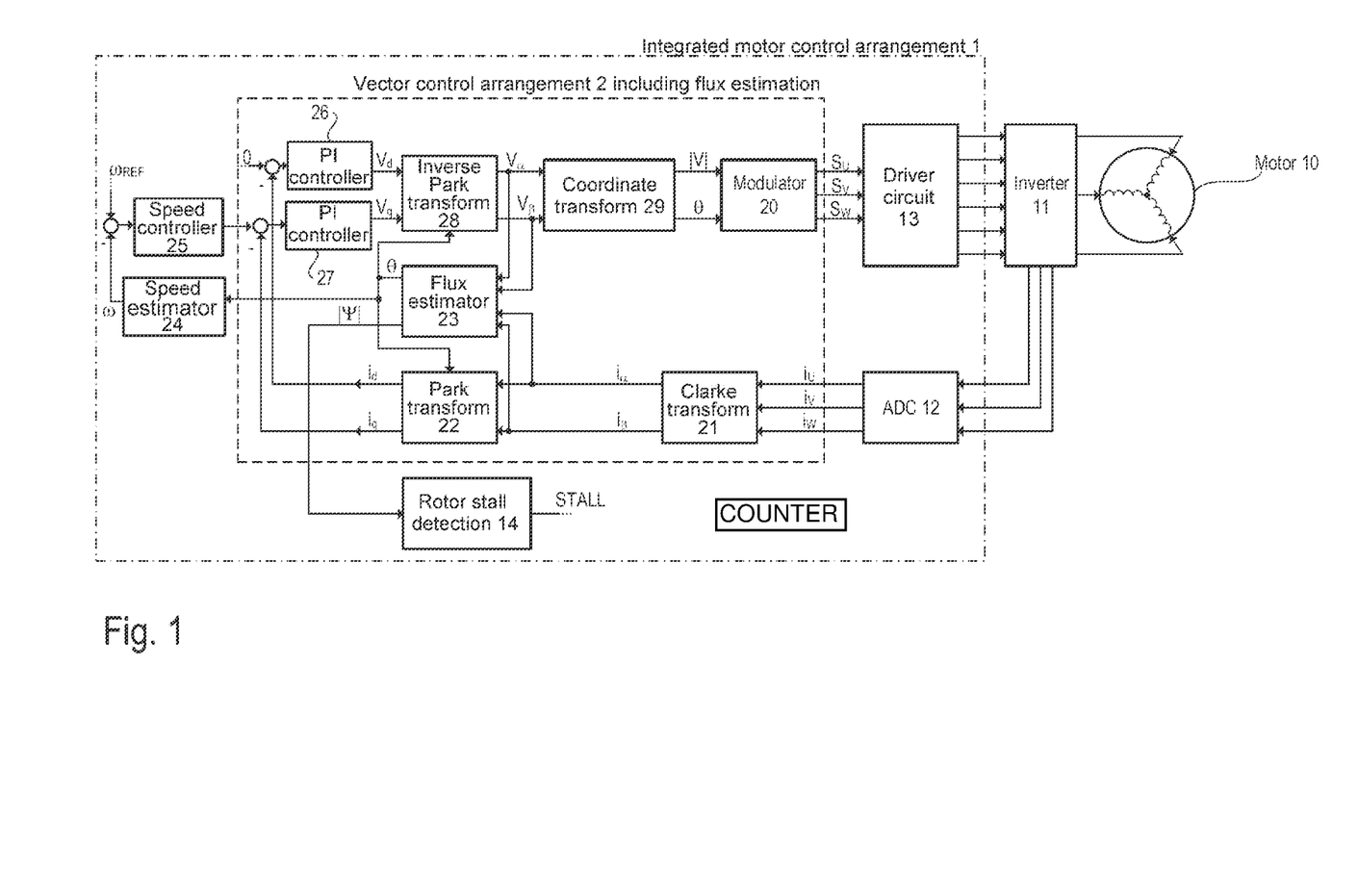
FIG. 1 shows an exemplary block diagram of an electric motor with sensor-free field-oriented control of the rotation speed and with rotor stall detection.

FIG. 1 is a block diagram for illustrating an electric motor 10, such as a permanent-magnet synchronous motor for example, with sensor-free field-oriented control 2 (FOC) which is often also referred to as vector control. In the present example, the motor 10 has three phases which are driven by means of an inverter 11. However, systems with more than three phases can also be used. The design of the inverter 11 is known per se. A suitable inverter usually comprises three transistor half-bridges (one half-bridge per phase), wherein the outputs of the half-bridges are each connected to one phase of the motor 10. The inverter 11 can also contain sensor circuits for measuring the phase currents of the motor 10. In the illustrated example, the current measurement signals are digitized by means of an analog/digital converter 12. The digital current values of the three phase currents are denoted iU, iV and iW. Various concepts for measuring the phase currents (shunt resistors, sense transistors etc.) are known, and the specific type of current measurement is not relevant for the further discussion and therefore will not be explained further here.

For the purpose of field-oriented control, the three phase currents are with iU, iV and iW are transformed into a rectangular coordinate system by means of the Clarke transform (function block 21). The result of the Clarke transform are the currents $i_\alpha$ and $i_\beta$, which can also be considered to be the real component and the imaginary component of the complex-valued current $i=i_\alpha+j\cdot i_\beta$ (j denotes the imaginary unit). The currents $i_\alpha$ and $i_\beta$ (that is to say the digital representation of said currents) are then subjected to a Park transform which is also referred to as a d/q transform (function block 22), The Park transform is substantially a further coordinate transformation from a quiescent coordinate system into a coordinate system which co-rotates with the rotor (d/q coordinate system). The transformed currents are denoted $i_d$ and $i_q$ and can likewise be considered to be the real component and the imaginary component of the complex-valued current $I=i_d+j\cdot i_q$. The angular position θ the rotor is required for carrying out the Park transform, which angular position can either be directly measured (for example by means of the rotary encoder) or can be calculated from current values and voltage values (see flux estimator 23). The examples described here relate to sensor-free motors, that is to say no direct measurement of the angular position takes place.

The currents $i_d$ and $i_q$ (that is to say the digital representation of said currents) are compared with an associated setpoint value and the respective difference is respectively supplied to a digital controller 26 and, respectively, 27 (for example a PI controller). The motor voltages $V_d$ and $V_q$ (in the d/q coordinate system) are provided at the outputs of the controllers 26 and 27 as digital values. The voltages $V_d$ and $V_q$ (that is to say the digital representation of said voltages) are then transformed again into the non-rotating coordinate system (α/β coordinate system) by means of an inverse Park transform (function block 28), and the voltages $V_\alpha$ and $V_\beta$, which can also be considered to be the real component and the imaginary component of the complex-valued voltage $V=V_\alpha+j\cdot V_\beta$, are obtained as the result. These voltages are then transformed into polar coordinates |V|, θ (magnitude and phase of the complex-valued voltage V) and the resulting values |V| and θ are supplied to the modulator 20 which carries out, for example, a PWM. modulation (space-vector modulation). The modulated output signals $S_U$, $S_V$, $S_W$ are supplied to the driver circuit 13 which is designed to generate the gate drive signals for the transistors contained in the inverter. In the case of a three-phase system, the inverter 11 has three half-bridges, each with two power transistors, that is to say six transistors have to be driven.

Estimating the (complex-valued) rotor flux based on the currents $i_\alpha$ and $i_\beta$ and the voltages $V_\alpha$ and $V_\beta$ is known per se. To this end, the flux estimator uses a mathematical model of the motor, which model can depend on the specific construction of the motor. Various concepts and models for estimating the rotor flux Ψ are known per se and therefore will not be explained in any further detail here. However, it should be noted that the current rotor angle θ directly from the estimated complex-valued flux; the rotor angle θ is equal to the argument arg{Ψ} of the complex-valued rotor flux. The rotor angle is equal to the document arg{Ψ} of the estimated value of the flux Ψ. The information about the rotor angle is supplied to a speed estimator 24 which is designed to estimate the current motor rotation speed ω based on the value Ψ (more precisely based on arg{Ψ}. Said current motor rotation speed is compared with a setpoint value ωREF and the difference from the setpoint value is supplied to the rotation speed controller 25, which can likewise be designed as a PI controller. The output of the rotation speed controller 25 supplies the setpoint value for the current $i_q$ to the input of the PI controller 27. The setpoint value for the current $i_d$ at the input of the PI controller 26 can be set to zero.

In the exemplary embodiments described here, the motor controller comprises a rotor stall detector 14. Said rotor stall detector is designed to detect stalling of the rotor of the electric motor based on the estimated rotor flux Ψ and to generate a corresponding error flag in the case of stalling of the rotor having been detected. The function of the rotor stall detector will be discussed in more detail further below with reference to FIGS. 2A, 2B, 2C, 3, 4, 5A, 5B, 6A, and 6B.

As shown in FIG. 1, all components of the vector control arrangement 2 and also the speed estimation arrangement 24 and the speed controller 25, the rotor stall detection means 14, the analog/digital converter 12 and the driver circuit 13 are integrated in an integrated circuit (IC). The inverter 11 is generally a separate circuit component, but, as an alternative, could also be contained in the integrated motor control arrangement 1 (primarily in the case of relatively low powers). The components of the vector control arrangement 2 and also the speed estimator 24, the speed controller 25 and the rotor stall detector 14 can be implemented in a digital manner, for example by means of software/firmware. To this end, the integrated motor control arrangement can contain a processor which can run the software/firmware in order to carry out the functions illustrated in FIG. 1.

Figure 8:
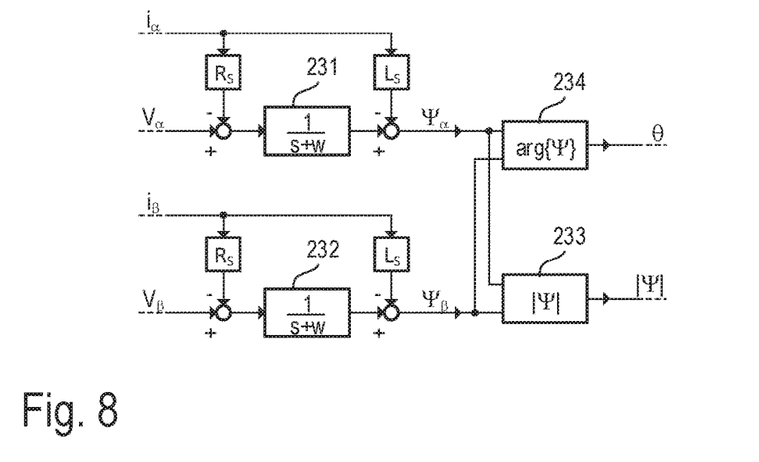
FIG. 8 illustrates an exemplary implementation of a flux estimator which can be used in the example from FIG. 1.

The flux estimator 23 contains a low-pass filter in order to suppress interference and noise. Significant interference is caused, for example, by the so-called DC drift which can be eliminated by the low-pass filter. The low-pass filter is used in the flux estimator 23 as an approximation of an integrator for integrating the voltages $V_\alpha$ and $V_\beta$ (minus the offset $R_S \cdot i_\alpha$ or $R_S \cdot i_\beta$, where $R_S$ is the resistance of the stator windings). In this case, the integrator—using Laplace notation 1/s—is replaced by a low-pass filter 1/(s+w). In this case, s denotes the Laplace variable and w denotes a real number. The low-pass filter (as an approximation of an integrator) results in the flux estimation no longer functioning reliably at low rotation speeds. In particular, a rotation speed of zero (that is to say stalled rotor) cannot be reliably estimated. An exemplary implementation of a flux estimator is illustrated in FIG. 8.

Figure 2A:
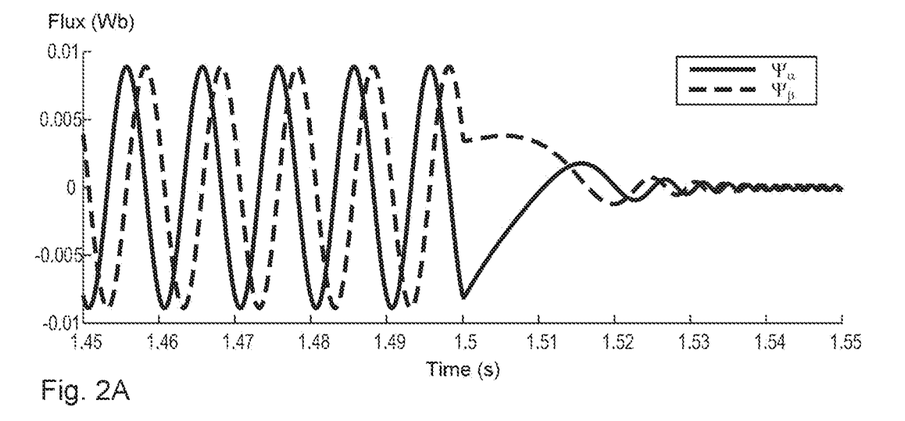
FIGS. 2A, 2B, and 2C are timing diagrams for illustrating, by way of example, the time profile of the estimated rotor flux (real component and imaginary component and also magnitude and phase) in the event of stalling of a rotor.
Figure 2B:
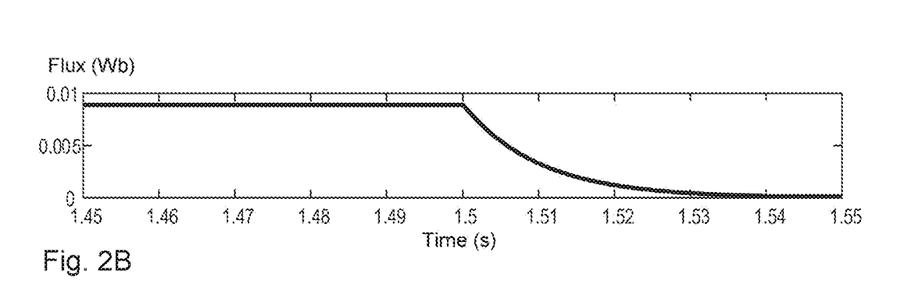
Figure 2C:
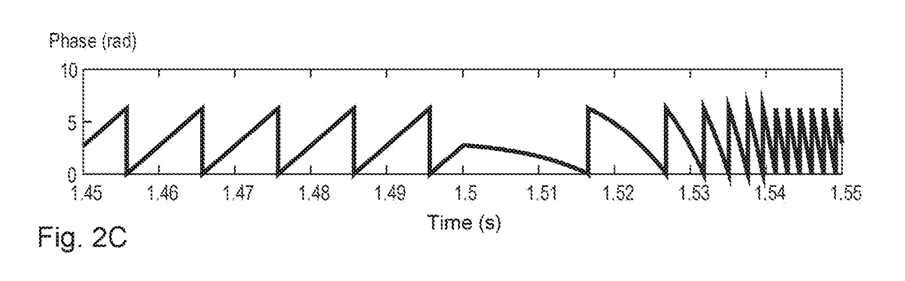

FIGS. 2A, 2B, and 2C illustrates, by way of example, in FIG. 2A the real component $\Psi_\alpha = \Re\{\Psi\}$ and the imaginary component $\Psi_\beta = \Im\{\Psi\}$ of the estimated rotor flux Ψ, wherein the rotor of the electric motor is suddenly stalled at time t=1.5 s. The corresponding magnitude |Ψ| and, respectively, the phase arg{Ψ} are illustrated in FIGS. 2B and 2C. It can be seen that the estimated flux (that is to say the complex space vector) becomes smaller in terms of magnitude starting from time t=1.5 s, but continues to rotate even though the rotor of the electric motor is actually at a standstill. Similar situations can also occur during normal operation (for example in the event of severe changes in load) and stalling of a rotor cannot be directly inferred from the estimated rotor flux Ψ.

Figure 3:
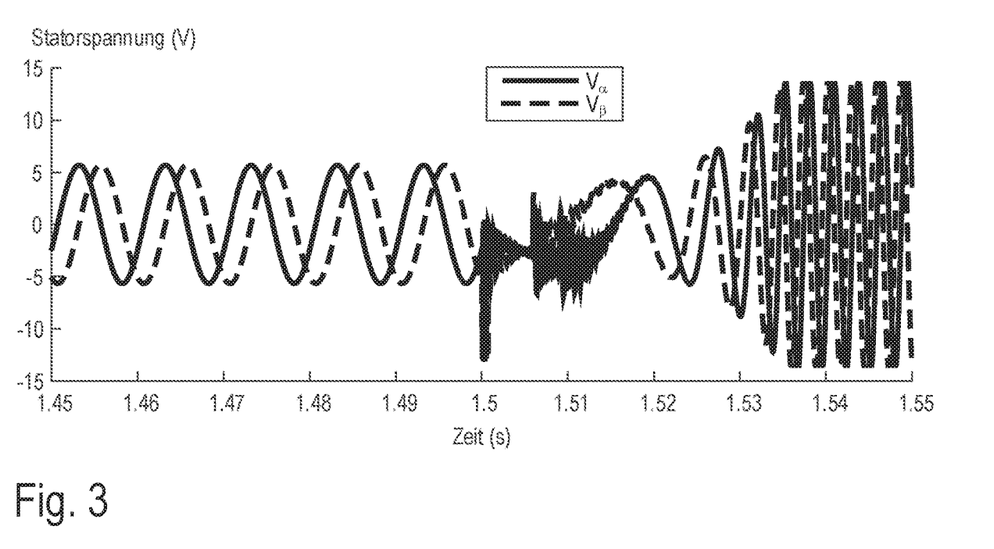
FIGS. 3 and 4 are timing diagrams for illustrating, by way of example, the time profile of stator voltage and stator current (in each case real component and imaginary component corresponding to FIGS. 2A, 2B, and 2C).
Figure 4:
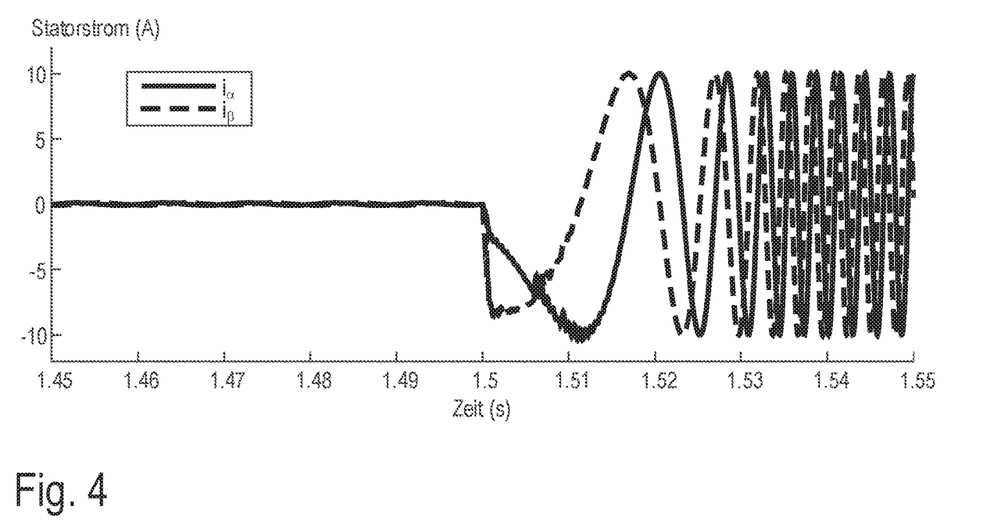

FIGS. 3 and 4 illustrate, by way of example, the stator voltage (real component $V_\alpha$, and imaginary component $V_\beta$) and also the associated motor current (real component $i_\alpha$ and imaginary component $i_\beta$). The waveforms from FIGS. 3 and 4 correspond to the waveform of the estimated rotor flux Ψ from FIGS. 2A, 2B, and 2C. FIG. 4 shows, for example starting from the time at which the rotor stalls (t=1.5 s), a sharp increase in the current amplitude up to a maximum. The same applies to the stator voltage illustrated in FIG. 3. The cause of this response is that the controller (PI controller 25, see FIG. 1) attempts to maintain the rotation speed and consequently successively increases the setpoint value for the motor current $i_q$ even though the rotor has stalled.

Figure 5A:
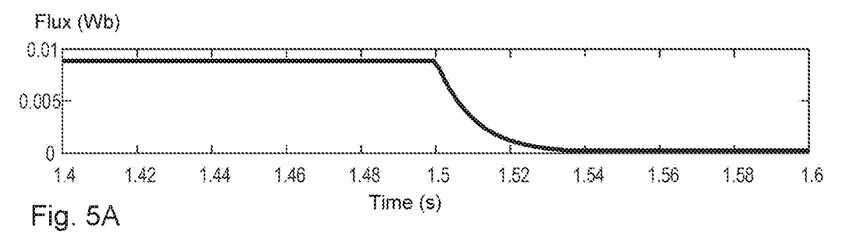
Figure 5B:
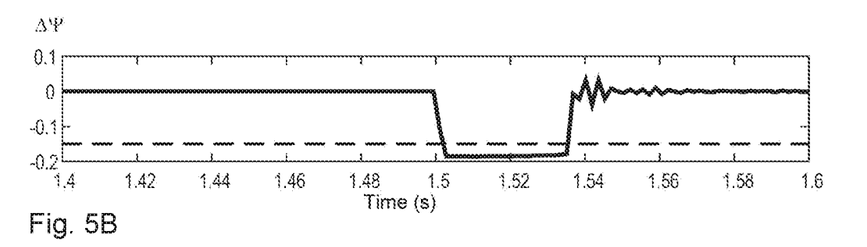

FIGS. 5A and 5B once again illustrates, in FIG. 5A, the magnitude of the estimated rotor flux $|\Psi|$, in FIG. 5B, the relative change $\Delta\Psi$ in the estimated rotor flux. That is to say, the change $\Delta\Psi[k]$ in the rotor flux is calculated in each time step (time index k) of the digital control operation according to the following equation:

$$\Delta\Psi[k] = (|\Psi[k]| - |\Psi[k-1]|) / |\Psi[k]|. \quad (1)$$

Here, the time parameter t is equal to $k \cdot T_s$ and $T_s$ is equal to the duration of the sampling interval. It should be noted at this point that the duration of the sampling interval Ts does not necessarily have to be same as the temporal step width $\Delta T$ which is used in field-oriented control. In the examples used here, the sampling interval Ts, which is used for the rotor stall detection (FIG. 1, function block 14), is a multiple of the temporal step width $\Delta T$ of the (discrete-time) vector control operation (FIG. 1, function blocks 20-22 and 26-29).

In the illustrated example, the magnitude of the estimated rotor flux $\Psi$ drops exponentially starting from time t=1.5 s. The exponential drop is caused by the abovementioned low-pass filter, that is to say said exponential drop is substantially the sudden response r(t) of the low-pass filter with the transfer function $T(s)=1/(s+w)$ and can be expressed as follows:

$$\Psi(t) = \Psi_0 \cdot \exp(-w \cdot (t-t_0)), \text{ for } t \geq t_0, \quad (2)$$

where $t_0$ denotes the time at which stalling of the rotor begins (that is to say $t_0=1.5$ s in the present example) and $\Psi_0$ denotes the magnitude of the flux at time $t_0$ (approximately 0.009 Wb in the present example). Insertion of equation 2 into equation 1 gives (where $t=k \cdot T_S$)

$$\Delta\Psi[k] = 1 - \exp(-w \cdot T_S), \quad (3)$$

which is a (theoretically) constant system parameter.

In view of the theoretical considerations discussed above, stalling of a rotor can be detected comparatively reliably by way of the phase of an exponential drop of the estimated rotor flux $\Psi[k]$ being detected. This phase of the exponential drop is distinguished in that the change $\Delta\Psi[k]$ in the estimated rotor flux suddenly drops to a constant value, which can be relatively easily detected by means of comparison with a threshold value TH. The calculated relative change in flux $\Delta\Psi[k]$ remains at a comparatively low constant value for a certain time, before it increases again. In the case of a low-pass filter with the characteristic $1/(s+w)$, the phase in which the calculated relative change in flux $\Delta\Psi[k]$ remains at the low constant value lasts for approximately 3/w. In the example illustrated here (w=100 s$^{-1}$), this phase lasts for approximately 30 ms.

The waveforms illustrated here are simulation results. In practical applications, a situation of the threshold value TH being undershot once is not enough to adequately conclude that a rotor has stalled (this would lead to faulty detection operations). As can be seen in FIG. 5B, the phase of the exponential drop in the estimated rotor flux $\Psi$ lasts for a comparatively long time, over 30 milliseconds in the present example. This time period is likewise known for a specific system since it is determined substantially by system parameters (low-pass filter characteristic and characteristics of the PI controller).

Figure 6A:
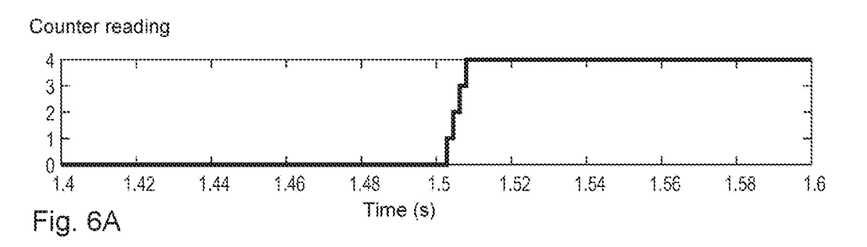
FIGS. 6A and 6B are timing diagrams for illustrating stalling of a rotor.
Figure 6B:
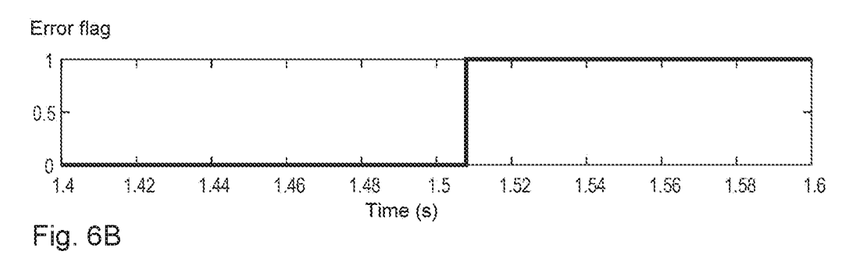

In order to ensure that stalling of a rotor is triggered only when the threshold value TH is undershot for a certain time period, a counter is used, which counter, in each sampling interval, is incremented by one if the calculated relative change in flux $\Delta\Psi[k]$ undershoots the threshold value TH, and is decremented by one if the calculated relative change in flux $\Delta\Psi[k]$ does not undershoot the threshold value TH, wherein the counter value cannot be lower than zero (that is to say a counter reading of zero will not be decremented further). In the illustrated example, a sampling interval is approximately 1.7 ms. Stalling of a rotor is first identified in the example illustrated in FIG. 6A and FIG. 6B when the counter reading has reached a predefined value (for example 4). Stalling of the rotor can be flagged, for example, by means of an error flag. In the illustrated example, the stalling of the rotor is flagged with a systematic delay of approximately 7 ms, which is unproblematical for most applications however, by incrementing the counter. FIG. 6A schematically illustrates the counter reading, and FIG. 6B schematically illustrates the associated error flag.

The error flag is a Boolean value (for example one hit) which indicates whether the counter reading has reached a critical value (maximum value). In the present example, this critical value is four. In response to an error flag which indicates a stalled rotor, the power output stage (that is to say the inverter 11), for example, can be deactivated, for example by way of the driver circuit 13 no longer turning on the transistors of the inverter. Therefore, overheating of the inverter 11 or of the motor 10 is avoided.

Figure 7:
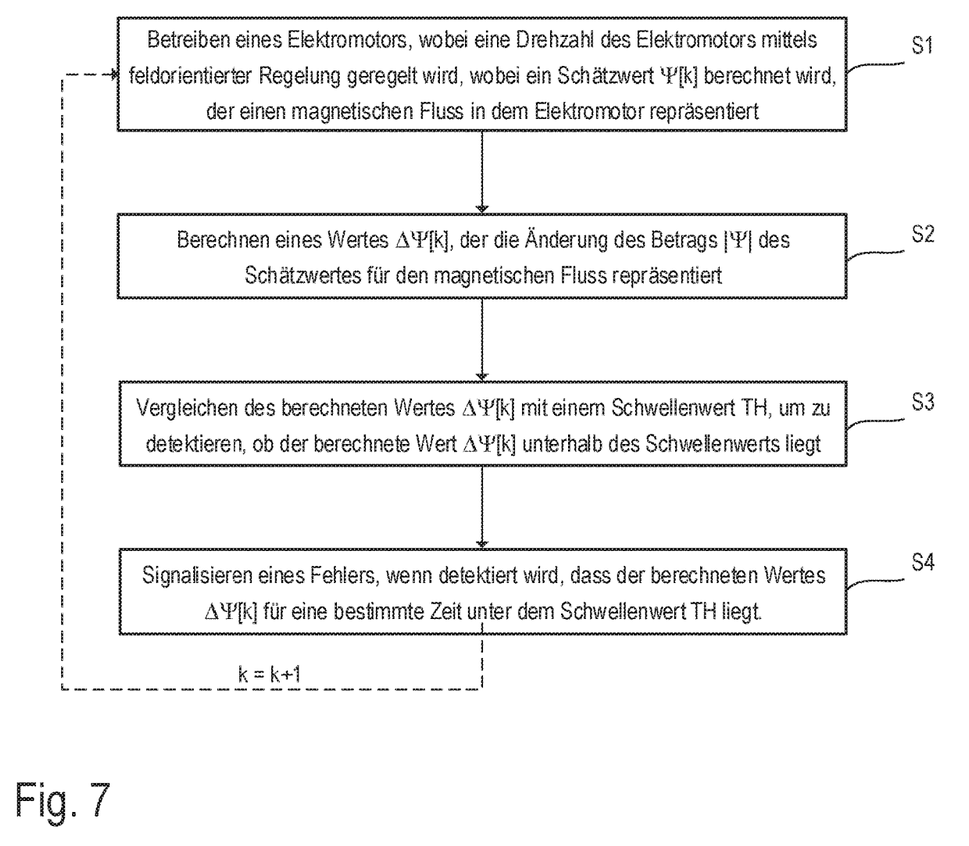
FIG. 7 is a flow diagram for illustrating an example of the method described here for detecting stalling of a rotor.

An example of a method for detecting stalling of the rotor of the electric motor will be summarized below with reference to the flowchart in FIG. 7. The method can be implemented in a motor control arrangement of a sensor-free, permanent-magnet synchronous motor. According to FIG. 7, the method comprises operating an electric motor, wherein a rotation speed of the electric motor is controlled by means of field-oriented control (vector control), and wherein an estimate $\Psi[k]$ is calculated at regular intervals (for example in each time step k of the control operation), which estimated value represents the magnetic flux in the electric motor (see FIG. 7, step S1). The estimate $\Psi[k]$ is a complex number and algorithms for calculating said complex number are known per se. A mathematical model of the motor is usually used for the calculation. The field-oriented control operation is also a control method which is known per se. The method from FIG. 7 further comprises calculating a value $\Delta\Psi[k]$ which represents the relative change in the magnitude of the estimate $|\Psi[k]|$ for the magnetic flux (see FIG. 7, step S2, and also equation 2) as well as comparing the calculated value $\Delta\Psi[k]$ with a threshold value in order to detect whether the calculated value $\Delta\Psi[k]$ lies below the threshold value (see FIG. 7, step S3). An error is flagged if it is detected that the calculated value lies below the threshold value for a specific time (see FIG. 7, step S4).

In the exemplary embodiments described here, the field-oriented control takes place in discrete time steps (time index k) according to a clock signal. The value $\Delta\Psi[k]$, which represents the change in the magnitude of the estimate $|\Psi[k]|$ for the magnetic flux, is likewise calculated at regular intervals in accordance with the clock signal (for example in each time step k of the field-oriented control operation or an integer multiple thereof). An error is flagged when it is detected that the calculated value $\Delta\Psi[k]$ lies below the threshold value for a predefined number of clock cycles.

A counter can be used in order to determine whether the calculated value $\Delta\Psi[k]$ already lies below the threshold value for the predefined time, in this case, the method comprises incrementing or decrementing the counter depending on the result of the comparison of the calculated value $\Delta\Psi[k]$ and the threshold value in the individual clock cycles. For example, a counter can be initialized with zero and incremented in each clock cycle (with index k) in which the calculated value $\Delta\Psi[k]$ lies below the threshold value. The counter can be decremented in each clock cycle in which the calculated value $\Delta\Psi[k]$ lies above the threshold value, provided that the current counter reading is greater than zero (that is to say the counter reading is not less than zero). An error is flagged when the counter reading reaches a specific, predefined value.

FIG. 8 is a block diagram for illustrating an exemplary implementation of a flux estimator which can be used in the example from FIG. 1. As already mentioned, the low-pass filters 231 and 232 are used for integrating the the voltages $V_\alpha - R_S \cdot i_\alpha$ and, respectively, $V_\beta - R_S \cdot i_\beta$ (stator voltages $V_\alpha$ and, respectively, $V_\beta$ in each case minus the offsets $R_S \cdot i_\alpha$ and, respectively, $R_S \cdot i_\beta$). The parameter $R_S$ denotes the non-reactive resistance of the stator windings of the electric motor. In this case, the integration takes place only approximately. An ideal integrator would have the transfer function $1/s$, whereas the transfer function $1/(s+w)$ is used in the in the illustrated implementation (non-standardized low-pass filter). In this case, the parameter w represents the time constant $\tau$ of the low-pass filter, where $w=1/\tau$. In the examples illustrated here, the time constant $\tau$ is equal to 10 ms ($w=100\ s^{-1}$). Other values are also possible depending on the implementation. The product $i_\alpha \cdot L_S$ and, respectively, $i_\beta \cdot L_S$ is respectively subtracted from the output signals of the low-pass filters 231 and 232 (the parameter Ls denotes the inductance of the stator windings). The results of the subtraction are the real component $\Psi_\alpha = \Re\{\Psi\}$ and, respectively, the imaginary component $\Psi_\beta = \Im\{\Psi\}$ of the estimated rotor flux $\Psi$. The function blocks 233 and 234 are designed to convert the real component $\Psi_\alpha$ and the imaginary component $\Psi_\beta$ of the estimated rotor flux $\Psi$ into the polar representation (magnitude $|\Psi|$ and phase $\theta$). Estimating the rotation speed of the motor then takes place on the basis of the phase angle $\theta$.

Although the invention has been described and illustrated with reference to an implementation, changes and/or modifications can be made to the illustrated examples, without departing from the spirit and scope of the appended claims. Particularly with regard to the various functions which are implemented by the above-described components or structures (units, assemblies, devices, circuits, systems, etc.), the designations and terms which are used to describe components/structures of this kind are also intended to correspond to any other component/structure which implements the specific function of the described component (that is to say which is functionally equivalent), even if it is not structurally equivalent to that structure which implements this function in the implementation described here.

The invention claimed is:

1. A method comprising:
operating an electric motor, wherein a rotation speed of the electric motor is controlled by field-oriented control, wherein an estimate is calculated, wherein the estimate represents a magnetic flux in the electric motor,
calculating a value which represents a change in magnitude of the estimate for the magnetic flux based on a first magnitude of the estimate for the magnetic flux at a first time step and a second magnitude of the estimate for the magnetic flux at a second time step that is different from the first time step;
comparing the calculated value with a threshold value in order to detect whether the calculated value is below the threshold value; and
flagging an error in response to detecting that the calculated value is below the threshold value for a specific time.

2. The method of claim 1,
wherein the field-oriented control takes place in discrete time steps according to a clock signal,
wherein the value which represents the change in the magnitude of the estimate for the magnetic flux is calculated at regular intervals in accordance with the clock signal, and
wherein the error is flagged in response to detecting that the calculated value is below the threshold value for a predefined number of clock cycles.

3. The method of claim 1, wherein flagging the error in response to detecting that the calculated value is below the threshold value for the predefined time comprises:
incrementing or decrementing a counter depending on the result of the comparison of the calculated value and the threshold value in one clock cycle,
flagging an error if the counter reaches a predefined counter value.

4. A system comprising:
an electric motor;
a control arrangement which is coupled to the electric motor and is designed to drive the electric motor and to control rotation speed of the electric motor by field-oriented control;
wherein the control arrangement is further designed to:
calculate an estimate which represents magnetic flux in the electric motor,
calculate a value which represents a change in magnitude of the estimate for the magnetic flux based on a first magnitude of the estimate for the magnetic flux at a first time step and a second magnitude of the estimate for the magnetic flux at a second time step that is different from the first time step; and
compare the calculated value with a threshold value in order to detect whether the calculated value is below the threshold value and to flag an error in response to detecting that the calculated value is below the threshold value for a specific time.

5. The system of claim 4,
wherein the control arrangement is designed to carry out the field-oriented control in discrete time steps according to a clock signal,
to calculate the value which represents the change in the magnitude of the estimate for the magnetic flux at regular intervals in accordance with the clock signal, and
to flag a fault in response to detecting that the calculated value is below the threshold value for a predefined number of clock cycles.

6. The system of claim 4, wherein the control arrangement is further designed:
to increment or to decrement a counter depending on a result of the comparison of the calculated value and the threshold value in one clock cycle, and to flag the fault if the counter reaches a predefined value.

7. An integrated circuit comprising:
a circuit arrangement which is designed to carry out field-oriented control for a synchronous motor, wherein the circuit arrangement includes a flux estimator which is designed to calculate an estimate for a magnetic flux in the synchronous motor; and a detector circuit which is designed to detect stalling of a rotor of the synchronous motor, wherein, to detect stalling of the rotor, the detector circuit is configured to:

calculate a value which represents a change in magnitude of the estimate for the magnetic based on a first magnitude of the estimate for the magnetic flux at a first time step and a second magnitude of the estimate for the magnetic flux at a second time step that is different from the first time step flux, compare the calculated value with a threshold value in order to detect whether the calculated value is below the threshold value, and determine that the rotor has stalled if the calculated value is below the threshold value for a specific time.

8. The integrated circuit of claim 7, wherein the circuit arrangement includes a driver circuit for an inverter which drives the synchronous motor during operation, wherein the circuit arrangement includes a digital/analog converter which is designed to digitize one or more current measurement signals, and wherein the circuit arrangement further includes a controller circuit for carrying out vector control based on the digitized current measurement signals, wherein the controller circuit comprises a modulator, wherein an output signal of the modulator is supplied to an input of the driver circuit.

9. The integrated circuit of claim 7, wherein the detector circuit includes a counter which is designed to count a number of clock cycles of a clock signal for which the calculated value is below the threshold value.

10. The integrated circuit of claim 9, wherein the detector circuit is designed to increment a counter reading of the counter in one clock cycle if the calculated value is below the threshold value and to decrement the counter reading of the counter in one clock cycle if the calculated value is not below the threshold value and the counter reading is greater than zero.

* * * * *